(12) United States Patent
Winnacker

(10) Patent No.: US 8,585,349 B2
(45) Date of Patent: Nov. 19, 2013

(54) TURBINE FOR DRIVING A GENERATOR IN A DRILL STRING

(75) Inventor: Helmut Winnacker, Burgdorf (DE)

(73) Assignee: Weatherford Energy Services GmbH, Edemissen (DE)

( * ) Notice: Subject to any disclaimer, the term of this patent is extended or adjusted under 35 U.S.C. 154(b) by 1014 days.

(21) Appl. No.: 12/653,129

(22) Filed: Dec. 9, 2009

(65) Prior Publication Data

US 2010/0183430 A1    Jul. 22, 2010

(30) Foreign Application Priority Data

Jan. 16, 2009   (DE) .......................... 10 2009 005 330

(51) Int. Cl.
    F01D 17/00      (2006.01)

(52) U.S. Cl.
    USPC ............. 415/26; 415/34; 415/141; 415/199.5

(58) Field of Classification Search
    USPC ............. 415/140–141, 199.4, 199.5, 229, 14, 415/26, 34, 48–50, 146–147; 175/107; 166/164; 290/43, 54
    See application file for complete search history.

(56) References Cited

U.S. PATENT DOCUMENTS

| | | | |
|---|---|---|---|
| 3,073,248 A | 1/1963 | Bartels | |
| 4,114,702 A * | 9/1978 | Maurer et al. ................ | 175/107 |
| 4,396,071 A | 8/1983 | Stephens | |
| 6,864,593 B2 | 3/2005 | Winnacker et al. | |
| 7,133,325 B2 * | 11/2006 | Kotsonis et al. ................ | 367/83 |
| 7,730,972 B2 * | 6/2010 | Hall et al. ....................... | 175/61 |
| 2002/0166700 A1 * | 11/2002 | Gillis et al. .................... | 175/57 |

FOREIGN PATENT DOCUMENTS

| | | |
|---|---|---|
| DE | 197 06 371 | 8/1998 |
| DE | 102 51 496 | 11/2005 |
| EP | 0 069 530 | 1/1983 |
| GB | 2 412 017 | 9/2005 |
| JP | 04-022766 | 1/1992 |

OTHER PUBLICATIONS

Mar. 26, 2010 British Search Report.
German Search Report dated Nov. 19, 2009 with English translation of the relevant parts.

* cited by examiner

*Primary Examiner* — Edward Look
*Assistant Examiner* — Jesse Prager
(74) *Attorney, Agent, or Firm* — Collard & Roe, P.C.

(57) ABSTRACT

The invention is directed to a turbine with a housing mountable in a drill string and having an inlet opening and an outlet opening for a fluid conveyed through the drill string, and with an impeller arranged in the housing and adapted to be impinged upon by the fluid flowing into the housing, wherein the impeller is axially movably mounted and yieldably supported against the afflux direction in such a way that the supporting force of the yielding support increases as the axial movement of the impeller increases. To reduce the dependence of the turbine rotational frequency and turbine performance on the feed rate and to avoid overloading of the generator, the housing includes in the range of movement of the impeller a frontal first housing section of smaller inner diameter as seen in the afflux direction and a rear second housing section of larger inner diameter as seen in the afflux direction.

12 Claims, 2 Drawing Sheets

TURBINE FOR DRIVING A GENERATOR IN A DRILL STRING

CROSS REFERENCE TO RELATED APPLICATIONS

Applicant claims priority under 35 U.S.C. §119 of German Patent Application No. 10 2009 005 330.1 filed Jan. 16, 2009.

FIELD OF THE INVENTION

This invention relates to a turbine for driving a generator, with a housing mountable in a drill string and having an inlet opening and an outlet opening for a fluid conveyed through the drill string, with at least one impeller arranged in the housing, which impeller is adapted to be impinged upon by the fluid flowing into the housing, is axially movably mounted and yieldably supported against the afflux direction in such a way that the supporting force of the yielding support increases as the axial movement of the impeller increases.

DESCRIPTION OF RELATED ART

In deep well drilling it is common practice to take measurements continuously while drilling by means of measurement systems installed in the drill string and to transmit the measurement results to the surface of the earth by means of telemetry devices. To generate the electric power required to operate the measurement and telemetry devices, use is generally made of a generator which is driven by a turbine arranged in the drill string. The turbine draws its drive energy from the drilling fluid stream which is conveyed through the drill string to the drill bit. The problem encountered with this approach however is that the feed rate of the drilling fluid fed through the drill string is dependent on the drilling conditions such as pump capacity, well depth and physical properties of the drilling fluid, to name but a few, and can be subject to severe fluctuations on a scale of 1 to 4. Such fluctuations are unsuitable for the drive of the generator connected to the turbine and would lead to hardly controllable fluctuations of rotational frequency and performance. It is necessary therefore to reduce the dependence of the turbine's performance and rotational frequency on the feed rate of the of the mud pump and to limit the drive performance of the generator to the desired degree.

In a turbine of the type initially referred to which is known from U.S. Pat. No. 6,864,593 B2, the impeller is coupled to the rotor of a generator and an axially adjustable throttling element of a throttling device in such a way that the variation of the pressure drop across the impeller, which results from a load change of the generator, produces an axial movement of the impeller and causes an adjustment of the throttling device. As a result of the adjustment of the throttling device, pressure pulses are produced in the drill string, which are intended for the transmission of signals to the earth's surface. No provision is made for a limitation of the rotational frequency and performance of the turbine.

From EP 0 069 530 A2 is known a bypass device for a turbine which is arranged in a drill string and has a valve which is arranged upstream from the turbine in the drill string in order to control the fluid stream bypassing the turbine. The valve is actuated by a piston arrangement which is acted upon in one direction by the pressure on the output side of the turbine and a compression spring, and in the opposite direction by the pressure on the input side of the turbine. The position of the valve varies in response to the pressure differential between input and output, thereby regulating the quantity of drilling fluid which gets to the turbine input and bypasses the turbine. By this means the output performance of the turbine should be maintained essentially constant in spite of changing operating conditions. Such a bypass device adds to the constructional expenditure, and its function may be impaired by particles in the drilling fluid.

In addition there is known from JP 04022766 A a speed controlling device for a turbine generator arranged in a drill string, wherein a valve is arranged at the turbine input and held in an open position by spring force. A bypass channel bypassing the turbine is provided parallel to the input of the valve. In this arrangement, the valve is increasingly closed as the feed rate of the supplied drilling fluid increases so that the bypass rate increases while the volume flow which reaches the turbine is kept essentially constant. This device has the disadvantage that a relatively large bypass cross section is always open so that in the presence of small feed rates the afflux to the turbine is too small. In addition there is the risk, particularly with the valve closed to greater degrees, of the valve passage becoming clogged with particles entrained in the drilling fluid.

SUMMARY OF THE INVENTION

It is an object of the present invention to provide a turbine of the type initially referred to for driving a generator in a drill string, whose maximum rotational frequency and drive performance are largely independent of the feed rate supplied. Desirably, the turbine enables a relatively high power output in the presence of a low feed rate and limits the rotational frequency and power output in the presence of a high feed rate in order to avoid overloading of the generator and the electric voltage stabilization.

Advantageous embodiments of the turbine are disclosed in claims 2 to 11.

According to the present invention, the turbine comprises a housing mountable in a drill string and having an inlet opening and an outlet opening for a fluid conveyed through the drill string, and it has at least one impeller arranged in the housing and adapted to be impinged upon by the fluid flowing into the housing, wherein the impeller is axially movably mounted and yieldably supported against the afflux direction in such a way that the supporting force of the yielding support increases as the axial movement of the impeller increases, and wherein the housing surrounds the range of movement of the impeller with a frontal first housing section of smaller inner diameter as seen in the afflux direction and a rear second housing section of larger inner diameter as seen in the afflux direction.

In the turbine of the invention, the turbine wheel is displaced in the housing by the dynamic pressure of the fluid impinging on the turbine wheel, which pressure is dependent on the feed rate, and in addition by the pressure differential when loaded in the afflux direction, with the impeller entering more and more into the housing section with the larger inner diameter with the displacement proceeding. The turbine of the invention thus compensates in a self-regulating way for variations in the feed rate of the supplied fluid by a displacement of the turbine wheel into a relief region of the turbine housing. The volumetric efficiency of the turbine decreases as a result, and the rise in turbine rotational frequency and turbine performance is dampened or restricted. In this manner, the dependence of the turbine rotational frequency and turbine performance on the feed rate is reduced, and overloading of the generator and the connected electrical devices is avoided. Correspondingly, the labor involved in providing the electric voltage stabilization can be kept smaller, which is a great advantage given the conditions prevailing in the well, such as high temperatures and restricted space. The embodiment of the invention affords the added advantage of dispensing with the need for bypass devices of the aforementioned type, thereby avoiding attendant disadvantages. The outer diameter of the turbine housing may be dimensioned such as to approach the inner diameter of a drill string closely, so that the turbine wheel may have a relatively large outer diameter with short blade lengths. This enables a sufficient turbine power to be achieved for driving the generator with only a low feed rate.

According to another proposal of the invention, for achieving a certain control characteristic the first and the second housing section may be separated from one another by a radial shoulder, or a transition region with continually changing inner diameter may be provided between the two housing sections. Furthermore it has proved advantageous for the diameter difference between the first and the second housing section to amount to at least 15%, particularly at least 20%.

An advantageous construction of the turbine and a favorable mounting of the impeller are achievable according to a further proposal of the invention by arranging for the impeller to be secured to an axially movably and rotatably mounted shaft, with the shaft being preferably a hollow shaft which is mounted on a stationary axle extending through the turbine. For driving the generator, the shaft of the impeller may be coupled to the generator shaft either through a coupling which compensates for axial movements or rigidly, with the latter case requiring the rotor of the generator to be equally mounted axially movably as the shaft of the impeller.

According to another proposal of the invention, the yielding support of the impeller or the shaft may be provided by a compression spring fixedly supported on the housing. Moreover, the yielding support may include mutually repelling permanent magnets which transmit the supporting force of the compression spring to the shaft without friction. Alternatively, it is also possible to provide a friction bearing or an anti-friction bearing to transmit the supporting force between the compression spring and the impeller or the impeller shaft. Preferably, the compression spring is mounted on the axle extending through the turbine and takes support on the axle in axial direction.

According to the invention, an increase in turbine performance while the housing's outer diameter is maintained unchanged is accomplishable in simple manner by mounting in the housing several impellers at an axial relative distance on an axially movably and rotatably mounted shaft, with the housing surrounding each impeller with a housing section that covers the axial range of movement of the respective impeller and includes a first housing section of smaller inner diameter and behind it in the afflux direction a second housing section of larger inner diameter. Moreover, the housing may include an annular baffle section between the housing sections encompassing the respective impellers, in which several flow-regulating baffles extending axially and radially inwardly are arranged at a substantially uniform distance from each other. By arranging one or several further impellers, energy is once again withdrawn from the fluid after its exit from the impeller first impinged upon by the fluid, as a result of which the drive performance available for driving the generator is increased significantly.

BRIEF DESCRIPTION OF THE DRAWING

The present invention will be explained in more detail in the following with reference to an embodiment illustrated in the accompanying drawing. In the drawing.

DETAILED DESCRIPTION OF A PREFERRED EMBODIMENT

Figure 1:
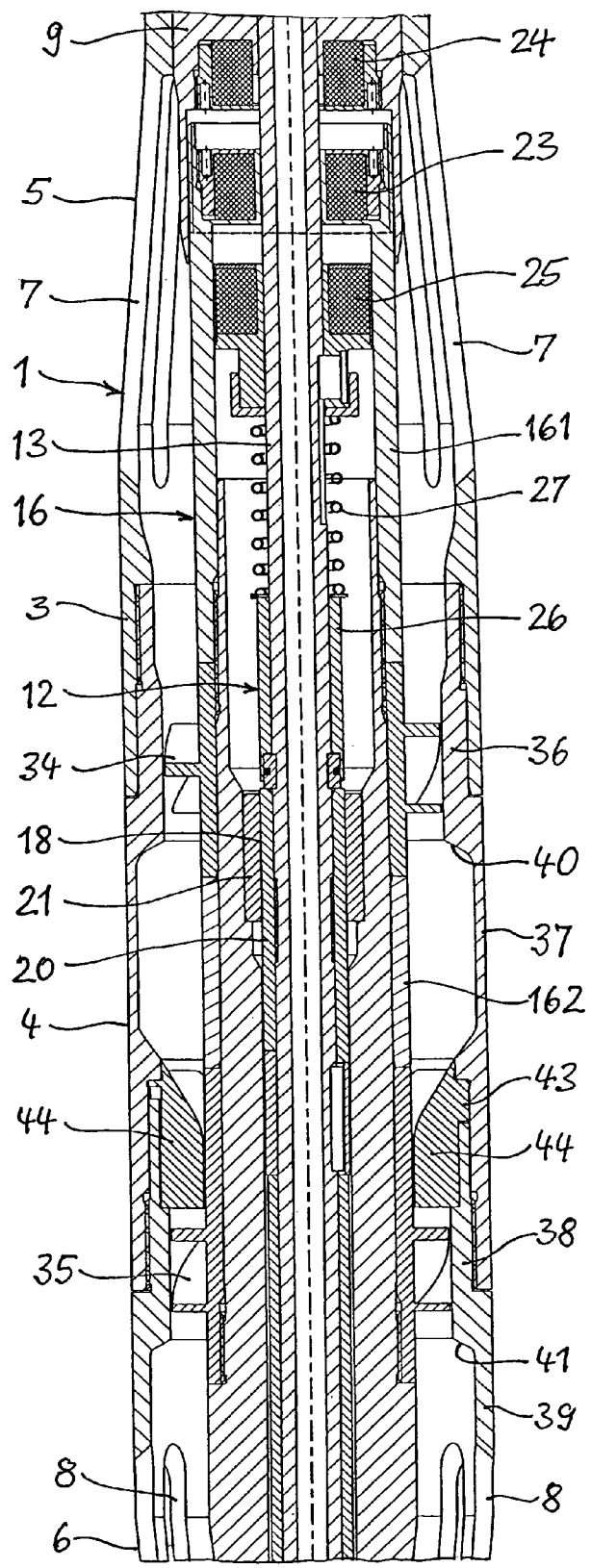
FIG. 1 is a longitudinal sectional view of a two-step turbine of the invention.
Figure 2:
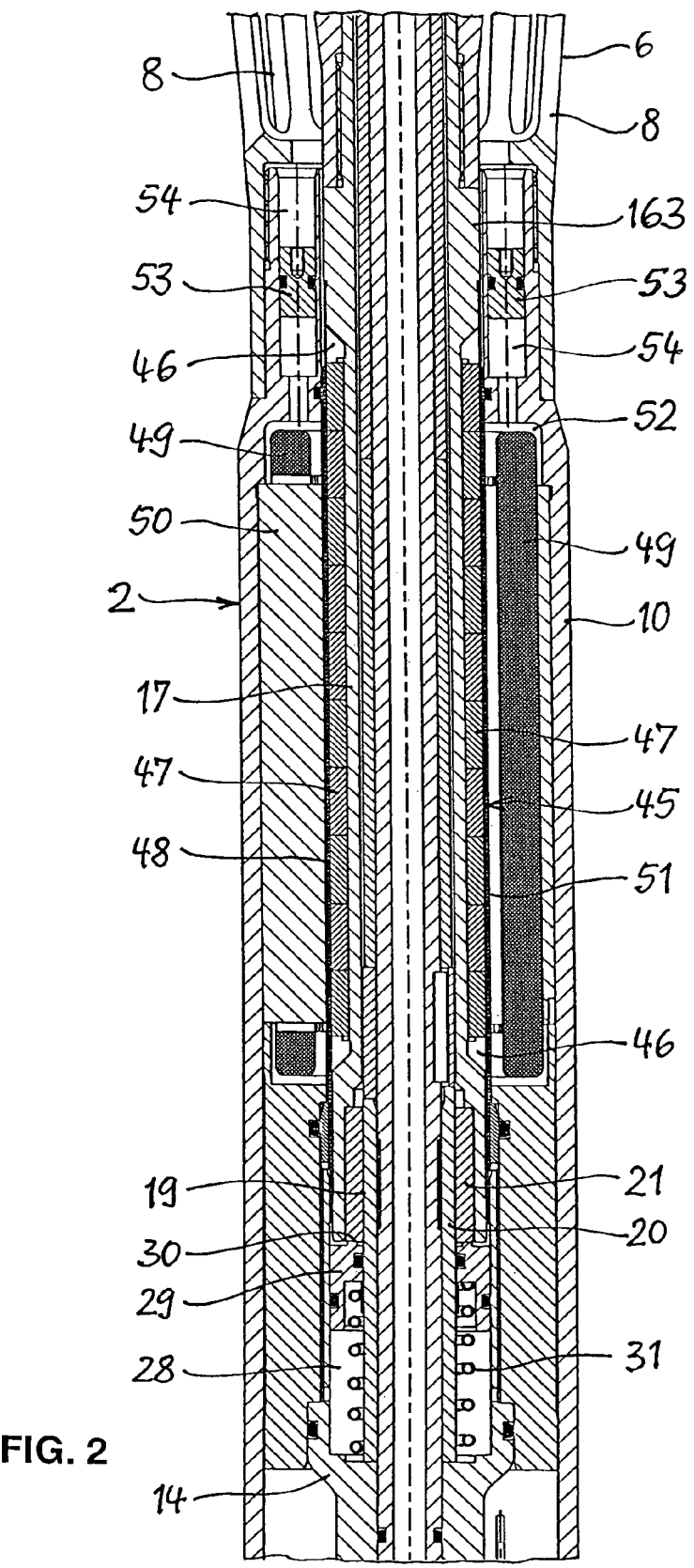
FIG. 2 is a view of a generator connected to the turbine of FIG. 1.

The turbine 1 illustrated in FIG. 1 and the generator 2 illustrated in FIG. 2 form in combination a constructional unit mountable in a drill string for deep well drilling in order to generate electric power intended to supply measurement instruments and to drive pulsating telemetry devices. The turbine 1 is shown in the drawing in such a way that the afflux end points upwards. The lower end of the turbine 1 is then adjoined by the upper end of the generator 2.

The turbine 1 has a housing 3 which is composed of three housing sections screwed together. The housing 3 has a cylindrical middle section 4 of an outer diameter which is smaller than the inner diameter of the drill string pipes into which the turbine 1 can be installed according to the intended purpose, with allowance only for the amount of play that is necessary for installation. Adjoining the two ends of the middle section 4 towards the housing ends are conically tapering housing sections 5, 6 which have a plurality of longitudinally extending slots for the formation of inlet openings 7 or outlet openings 8 for the fluid which is conveyed from a pump arranged above ground through the drill string in the direction of the drill bit. Above and hence upstream from the inlet openings 7, the housing 3 is closed by a wall 9. As becomes apparent from FIG. 2, the lower end of the housing 3 is bolted on a housing 10 of the generator 2.

Extending through the housing 3 in the longitudinal direction is an axle 12 which is composed of one central pipe 13 running throughout the length and several sleeves arranged on the pipe 13 in a manner preventing relative rotation and axial displacement. The pipe 13 has one end secured and sealed in the wall 9. The opposite end of the pipe 13 is fixedly connected with a wall 14 which closes the lower end of the housing 10 of the generator 2. The bore of the pipe 13 forms a channel for routing cables through which devices arranged upstream from the turbine 1, for example, measuring instruments, may be connected to devices arranged downstream from the generator 2.

A hollow shaft 16 is rotatably and axially displaceably mounted on the axle 12. The hollow shaft 16 is composed of three elements 161, 162, 163 screwed together. The elements 161, 162 are located in the turbine 1. The element 163 is arranged in the generator 2 and forms the generator shaft 17. To carry the hollow shaft 16 on the axle 12, a first friction bearing 18 is arranged in the turbine 1 and a second friction bearing 19 is arranged in the generator 2. Both friction bearings 18, 19 include an inner bushing 20 formed fast with the axle and a movable outer bushing 21. The bushings 20, 21 are made of a wear-resistant material with suitable sliding properties. The length of the inner bushings 20 is greater than that of the outer bushings 21 and dimensioned sufficiently long to enable the hollow shaft 16 to be displaced in axial direction for a predetermined length without the sliding surfaces of the bushings 20, 21 becoming disengaged.

Arranged at the upper end of the hollow shaft 16 concentrically with the axle 12 is an annular permanent magnet 23. Two more annular permanent magnets 24, 25 are located on either side of and spaced from the permanent magnet 23. The permanent magnet 24 is inserted in a recess in the wall 9. The permanent magnet 25 is axially slidably mounted on the pipe 13 in the interior of the hollow shaft 16 and secured against relative rotation on the pipe 13. On the side facing away from the permanent magnet 23, the permanent magnet 25 takes support upon a stop sleeve 26 of the axle 12 by means of a compression spring 27. The poles of the permanent magnets 23, 24, 25 are oriented in such a way that the permanent magnets repel each other. The permanent magnets 23, 24, 25 and the compression spring 27 guide the hollow shaft 16 in axial direction, with the permanent magnets 23, 24, 25 effecting a friction-free transmission of the guide forces. In the absence of fluid impinging on the turbine 1, the hollow shaft 16 is held in the axial position shown in FIG. 1.

An annular bearing element 29 is axially movably arranged in a bore 28 of the generator housing 10 at the opposite lower end of the hollow shaft 16. The bearing element 29 forms in combination with the end surface of the adjacent bushing 21 an axial bearing 30 which may also fulfill a sealing and filter function. On the side of the bearing element 29 facing away from the axial bearing 30, the bore 28 accommodates a compression spring 31 which bears against the wall 14 closing the bore 28 and urges the bearing element 29 against the bushing 21.

Secured to the element 162 of the hollow shaft 16 are two impellers 34, 35 arranged in spaced relationship to each other. The impellers 34, 35 are located in the cylindrical middle section 4 of the housing 3 between the inlet openings 7 and the outlet openings 8. The impellers 34, 35 define with the edges of their blades a circular-ring-shaped range of movement which, due to the axial displaceability of the hollow shaft 16, extends for some length from the illustrated initial position of the impellers 34, 35 in the direction of the generator. The housing 3 surrounds the axially extending range of movement of each impeller 34, 35 with two different housing sections 36, 37 and 38, 39, respectively. The frontal housing sections 36, 38 as seen in the direction of flow are cylindrical and have an inner diameter which is only slightly greater than the outer diameter of the range of movement of the impeller 34 and 35, respectively. As seen in the direction of flow, the housing sections 37, 39 lie downstream from the housing sections 36, 38 and have a cylindrical inner wall of an inner diameter which, depending on the required control range, is around 15 to 25% greater than the inner diameter of the housing sections 36, 38. Radially outwardly extending shoulders 40, 41 form the transitions between the different housing sections 36, 37 and 38, 39, respectively. The shoulders 40, 41 have a steep, frusto-conical annular surface. Depending on the desired control characteristic, the shoulders 40, 41 may also have a flatter shape. Alternatively, a transition region with varying slope may be provided.

Also arranged in the housing 3 upstream from the impeller 35 is a baffle ring 43 which has an inner diameter substantially equal to the inner diameter of the housing section 38 and includes several circumferentially spaced flow-regulating baffles 44 which extend radially inwardly in close proximity to the hollow shaft 16 and axially. The function of the flow-regulating baffles 44 is to retard the eddies formed in operation on the outlet side of the impeller 34 and to direct the fluid into the appropriate direction onto the impeller 35.

The generator 2 has a rotor 45 with a plurality of magnet segments 47 which produce a bipolar magnetic field. The magnet segments 47 are arranged in longitudinal grooves 46 of the generator shaft 17 and are covered by a sleeve 48 made of a thin-walled, nonmagnetic material which embraces the grooved area of the generator shaft 17 and effects a seal to the outside. The rotor 45 is surrounded by generator windings 49 and iron cores 50 which are arranged in the generator housing 10 behind a stator sleeve 51 made of a thin-walled, nonmagnetic material of low electric conductivity to avoid eddy currents. Between the sleeve 48 and the stator sleeve 51 is a narrow gap which is in communication with the outlet openings 8 and through which the fluid is able to reach the friction bearing 19 and also enter the bore 28. The generator windings 49 are arranged in a closed chamber 52 of the housing 10, which chamber is filled with an insulating liquid. By means of pressure compensating pistons 53 slidably arranged in bores 54, the pressure in the chamber 52 is adjusted to the respective pressure in the area of the outlet openings 8.

When the fluid flow passes through the inlet openings 7 to impinge on the turbine 1, a pressure differential is created at the impellers 34, 35 as a result of their flow resistance, which generates a pressure force acting upon the hollow shaft 16 in the direction of the generator 2. When the amount of fluid supplied is still relatively small, the force of the compression springs 27, 31 and the repelling force between the permanent magnets 23, 25 offers sufficient resistance for the hollow shaft 16 and the impellers 34, 35 mounted thereon to be held in the position shown in FIG. 1. When the feed rate increases, the pressure differential on the impellers 34, 35 increases likewise and with it also the axial loading of the hollow shaft 16. As a result of the higher loading, the compression springs 27, 31 can be somewhat compressed, causing the hollow shaft 16 to be displaced in the direction of the generator 2. When the displacement of the hollow shaft 16 remains so small that the impellers 34, 35 do not leave the housing sections 36, 38, the volumetric efficiency of the impellers 34, 35 changes only insignificantly, the maximum rotational frequency and performance of the turbine 1 increase in accordance with the increased feed rate. With the feed rate continuing to increase, the correspondingly increasing loading of the hollow shaft 16 displaces the impellers 34, 35 initially in part beyond the control edges of the shoulders 40', 41 into the region of the housing sections 37, 39. As a result, the volumetric efficiency of the impellers 34, 35 deteriorates so that the further increase in the maximum rotational frequency and performance becomes weaker. With a still further increase in the flow rate, the impellers 34, 35 are ultimately moved entirely into the region of the housing sections 37, 39. This reduces the volumetric efficiency of the impellers 34, 35 still further, enabling a significant part of the flow rate to flow around the impellers 34, 35. In this way, the maximum rotational frequency and performance of the turbine 1 is effectively limited, and overloading of the generator 2 and the connected systems is avoided.

Aside from the flow rate delivered to the turbine 1, also the torque load of the impellers 34, 35 has an impact on the pressure differential on the impellers 34, 35. Measured by the impact of the flow rate, this impact is however significantly smaller and does not impair the performance for driving the generator.

What is claimed is:

1. A turbine for driving a generator, with a housing mountable in a drill string and having an inlet opening and an outlet opening for a fluid conveyed through the drill string, with at least one impeller arranged in the housing and adapted to be impinged upon by the fluid flowing into the housing, wherein the impeller is axially movably mounted and yieldably supported against the afflux direction in such a way that the supporting force of the yielding support increases as the axial movement of the impeller increases, and wherein the housing comprises a frontal first housing section of smaller inner diameter as seen in the afflux direction and a rear second housing section of larger inner diameter as seen in the afflux direction, wherein the first housing section and the second housing section are of cylindrical shape, are separated from one another by a radially outwardly extended shoulder forming a transition between the first and second housing sections, and both surround the range of motion of the impeller.

2. The turbine according to claim 1, wherein the impeller is secured to an axially movably and rotatably mounted shaft.

3. The turbine according to claim 2, wherein in the housing several impellers are mounted at an axial relative distance on an axially movably and rotatably mounted shaft, with the housing surrounding the range of movement of the respective impeller with a frontal first housing section of smaller inner diameter as seen in the afflux direction and a rear second housing section of larger inner diameter as seen in the afflux direction.

4. The turbine according to claim 3, wherein the housing includes between the housing sections surrounding the individual impellers a baffle ring in which several axially and radially inwardly extending flow-regulating baffles are arranged at a relative distance.

5. The turbine according to claim 1, wherein a transition region with continually changing inner diameter is provided between the first housing section and the second housing section.

6. The turbine according to claim 2, wherein the shaft is rigidly coupled to the rotor of a generator, with the rotor being axially movably mounted.

7. The turbine according to claim 2, wherein the shaft is a hollow shaft which is mounted on an axle extending through the turbine and the generator.

8. The turbine according to claim 1, wherein the yielding support of the impeller includes mutually repelling permanent magnets.

9. The turbine according to claim 1, wherein the yielding support includes a compression spring and the supporting force of the compression spring is transmitted to the impeller through mutually repelling permanent magnets.

10. The turbine according to claim 1, wherein the yielding support includes a compression spring and the supporting force of the compression spring is transmitted to the impeller through friction or antifriction bearings.

11. The turbine according to claim 2, wherein the supporting force of the yielding support is transmitted through the shaft to the impeller.

12. The turbine according to claim 1, wherein the impeller is secured to an axially movably and rotatably mounted shaft which is rigidly coupled to the rotor of a generator, with the rotor being axially movably mounted, the shaft being a hollow shaft which is mounted on an axle extending through the turbine and the generator, and the generator comprises a rotor surrounding the hollow shaft and having a plurality of magnet segments which produce a bipolar magnetic field, the rotor being surrounded by a stator arranged in the generator housing and having generator windings and iron cores.

* * * * *